(12) United States Patent
Kim (10) Patent No.: US 11,431,000 B2
(45) Date of Patent: Aug. 30, 2022

(54) FUEL CELL APPARATUS

(71) Applicants: Hyundai Motor Company, Seoul (KR); Kia Motors Corporation, Seoul (KR)

(72) Inventor: Ki Jung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 297 days.

(21) Appl. No.: 16/589,938

(22) Filed: Oct. 1, 2019

(65) Prior Publication Data

US 2020/0358110 A1   Nov. 12, 2020

(30) Foreign Application Priority Data

May 10, 2019 (KR) ........................ 10-2019-0055023

(51) Int. Cl.
  *H01M 8/0258* (2016.01)
  *H01M 8/0245* (2016.01)
  *H01M 8/0247* (2016.01)

(52) U.S. Cl.
  CPC ....... *H01M 8/0258* (2013.01); *H01M 8/0245* (2013.01); *H01M 8/0247* (2013.01)

(58) Field of Classification Search
  CPC ............ H01M 8/0258; H01M 8/0245; H01M 8/0247; Y02E 60/50
  See application file for complete search history.

(56) References Cited

U.S. PATENT DOCUMENTS

| 2012/0009489 A1* | 1/2012 | Hashimoto | H01M 8/1004 429/414 |
| 2015/0349354 A1* | 12/2015 | Fukuyama | H01M 8/0297 429/434 |

FOREIGN PATENT DOCUMENTS

| JP | 2010-170984 A | 8/2010 |
| JP | 5589946 B2 | 9/2014 |
| KR | 10-2015-0070124 A | 6/2015 |
| KR | 101867696 B1 | 6/2018 |

* cited by examiner

*Primary Examiner* — Brittany L Raymond
(74) *Attorney, Agent, or Firm* — Fox Rothschild LLP (57) ABSTRACT

A fuel cell apparatus is provided to improve air transfer performance in a fuel cell and disperse a load acting on a gas diffusion layer to improve durability. A flat contact portion is secured with respect to the gas diffusion portion to prevent the gas diffusion layer from being damaged and deformed.

10 Claims, 5 Drawing Sheets

FUEL CELL APPARATUS

CROSS REFERENCE TO RELATED APPLICATION

The present application claims priority of Korean Patent Application No. 10-2019-0055023 filed on May 10, 2019, the entire contents of which is incorporated herein for all purposes by this reference.

BACKGROUND

Field of the Invention

The present disclosure relates to a fuel cell apparatus in which a fuel being supplied to a fuel cell stack circulates, and more particularly, to a fuel cell apparatus that prevents a gas diffusion layer from being damaged.

Description of the Related Art

A fuel cell is an apparatus that converts chemical energy of a fuel directly into electric energy through an electrochemical reaction. Since the fuel cell is not theoretically subject to thermodynamic restriction of a heat engine, it has higher power generation efficiency than that of a power generator in the related art, and it reduces pollution and noise. Further, since the fuel cell may be produced with various capacities and the fuel cell is capable of being installed in a power demand place, the fuel cell may save initial investment costs of power transmission equipment.

A fuel cell system using such a fuel cell includes a fuel cell stack to generate a power, a reformer configured to reform a fuel, such as liquefied natural gas (LNG), coal gas, or methanol, into hydrogen to produce a fuel gas containing high proportions of hydrogen, a power converter configured to convert a generated direct current (DC) power into an alternating current (AC) power, and a controller. In particular, the fuel cell stack is composed of several hundreds of stacked cells, and is designed to supply water, fuel, and air to the respective cells. Basically, each cell is composed of two electrodes of an anode and a cathode that are separated from each other by an electrolyte, and the respective cells are separated from each other by separators.

Recently, to improve the performance of the fuel cell stack, a porous flow field is applied to a cathode flow field. However, in the porous flow field, a sharp edge portion may occur based on the product shape thereof, and such a sharp edge portion may cause a gas diffusion layer to be deformed or damaged in a process of fastening the fuel cell stack thus causing a quality problem.

The foregoing is intended merely to aid in the understanding of the background of the present disclosure, and is not intended to mean that the present disclosure falls within the purview of the related art that is already known to those of ordinary skill in the art.

SUMMARY

The present disclosure provides a fuel cell apparatus, which may cause a smooth air flow in a cathode flow field and may prevent a gas diffusion layer from being damaged.

In an aspect of the present disclosure, a fuel cell apparatus may include a gas diffusion layer of a fuel cell; a base plate spaced apart from the gas diffusion layer and configured to generate an air circulation; and a flow field forming member having a plurality of first circulation portions formed to extend in a width direction and having first openings formed to allow air to pass through, each of the plurality of first circulation portions having a first end portion and a second end portion formed to extend toward the gas diffusion layer and the base plate, respectively, the plurality of first circulation portions disposed apart from each other along a length direction, and a plurality of second circulation portions formed to extend in the width direction and having second openings formed to allow air to pass through, each of the plurality of second circulation portions alternately connecting the first end portion or the second end portion of each of the first circulation portions along the length direction. A shape of a side surface of the flow field forming member may be in the form of repeated polygonal patterns through the first circulation portions and the second circulation portions.

The plurality of first circulation portions may extend with an inclination in a direction in which the gas diffusion layer and the base plate face each other, and may be repeatedly deployed to cross each other along the length direction. Additionally, the first circulation portions may be repeatedly deployed to cross each other in a state where a distance between the first end portions is different from a distance between the second end portions, and the second circulation portions may be connected to a portion having a long distance between the end portions. The shape of the side surface of the flow field forming member may be in the form in which triangles having apexes directed toward the gas diffusion layer and triangles having apexes directed toward the base plate are repeated.

The second circulation portions of the flow field forming member may be formed to extend along the length direction, and flat portions may be secured by the second circulation portions. A plurality of the first openings may be disposed apart from each other in the width direction in the first circulation portion, and one or more first partition portions may extend to cross a space in each of the first openings. The first partition portion may extend to cross a center of the first opening.

In the first circulation portion in which the first end portions or the second end portions are connected to each other by the second circulation portion, the first partition portion of the first opening formed in any one of the first circulation portions and the first partition portion of the first opening formed in another of the first circulation portions may extend in different directions. The first opening may be formed in a rectangular shape, and a plurality of the first partition portions may be configured to extend to cross a center of the first opening in different directions.

The plurality of the first partition portions may extend to be orthogonal in the center of the first opening, and in the first circulation portion in which the first end portions or the second end portions are connected to each other by the second circulation portion, the first partition portion of the first opening formed in any one of the first circulation portions and the first partition portion of the first opening formed in another of the first circulation portions may be disposed to be inclined to not mutually match each other. A plurality of the second openings may be disposed apart from each other in the width direction in the second circulation portion, and one or more second partition portions may extend to cross a space in the second opening. The second partition portion may extend to cross a center of the second opening.

According to the fuel cell apparatus having the above-described structure, the air transfer performance may be improved in the fuel cell, and the load acting on the gas diffusion layer may be dispersed to improve durability. Further, a flat contact portion may be secured with respect to the gas diffusion portion, and thus the gas diffusion layer may be prevented from being damaged and deformed.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a fuel cell apparatus according to exemplary embodiments of the present disclosure will be described with reference to the accompanying drawings.

Figure 1:
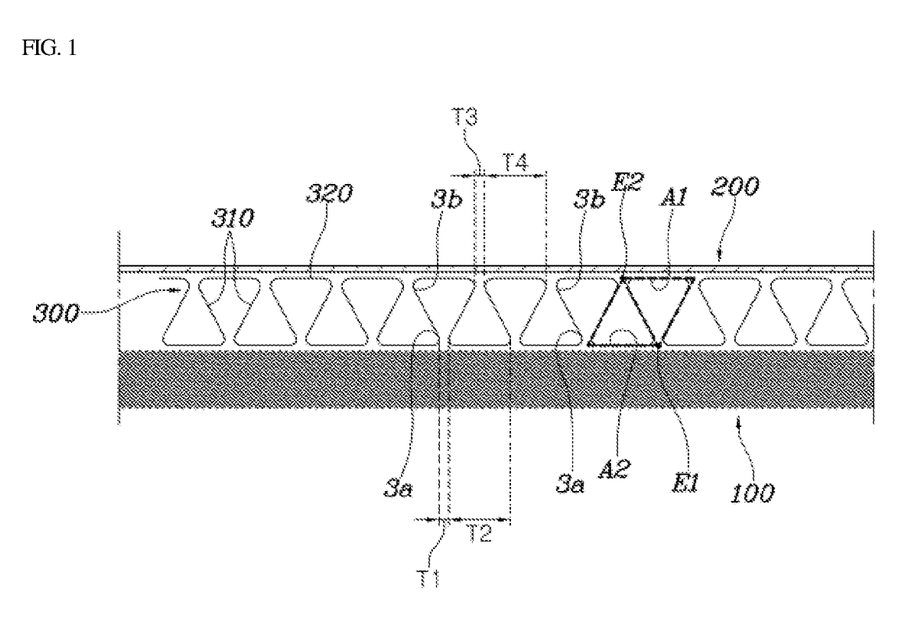
FIG. 1 is a view illustrating a fuel cell apparatus according to an exemplary embodiment of the present disclosure.

As illustrated in FIG. 1, a fuel cell apparatus according to the present disclosure may include a gas diffusion layer 100 of a fuel cell; a base plate 200 disposed apart from the gas diffusion layer 100 and configured to form an air circulation path; and a flow field forming member 300 having a plurality of first circulation portions 310 formed to extend in a width direction and having first openings 311 formed to allow air to pass through, each of the plurality of first circulation portions 310 having a first end portion 3a and a second end portion 3b formed to extend toward the gas diffusion layer 100 and the base plate 200, respectively, the plurality of first circulation portions 310 being arranged apart from each other along a length direction, and a plurality of second circulation portions 320 formed to extend in the width direction and having second openings 321 formed to allow air to pass through, each of the plurality of second circulation portions 320 alternately connecting the first end portion 3a or the second end portion 3b of each of the first circulation portions 310 along the length direction.

The present disclosure relates to a fuel cell that generates electric energy through an electrochemical reaction in which hydrogen oxidation reaction and oxygen reduction reaction occur simultaneously, and the fuel cell is configured by stacking a plurality of cells. Particularly, the cell may include two electrodes of an anode and a cathode that are separated from each other by an electrolyte, a membrane electrode assembly may be disposed between the respective electrodes, and the gas diffusion layer 100 may be disposed on an outside of the membrane electrode assembly. The base plate 200 may be disposed apart from the gas diffusion layer 100, and allows air to pass through a separated space. The base plate 200 may be made of a metal material. The flow field forming member 300 may be disposed between the gas diffusion layer 100 and the base plate 200, and air may circulate between the gas diffusion layer 100 and the base plate 200 through the flow field forming member 300.

The present disclosure relates to the flow field forming member 300, and the flow field forming member 300 may include a plurality of first circulation portions 310 and second circulation portions 320 that connects the first circulation portions 310. The first circulation portions 310 and the second circulation portions 320 may be configured as a plate shaped frame that extends in the width direction. Since the first openings 311 may be formed on the first circulation portions 310 and the second openings 321 may be formed on the second circulation portions 320, air may circulate through the first openings 311 and the second openings 321.

In particular, the first circulation portions 310 may be disposed apart from each other along the length direction, the first end portion 3a extends to the gas diffusion layer 100, and the second end portion 3b extends to the base plate 200. Further, the first end portions 3a or the second end portions 3b of the different first circulation portions 310 may be connected to each other by the second circulation portions 320, and thus the first circulation portions 310 and the second circulation portions 320 may be formed integrally. Since the second circulation portions 320 alternately connect the first end portions 3a or the second end portions 3b of the first circulation portions 310 that are adjacent to each other along the length direction, the shape of a side surface of the flow field forming member 300 may be in the form of repeated polygonal patterns through the first circulation portions 310 and the second circulation portions 320.

Accordingly, since the flow field forming member 300 may be interposed between the gas diffusion layer 100 and the base plate 200, the load supporting force may be secured, and the air may flow more smoothly. Specifically, as shown in FIG. 1, the plurality of first circulation portions 310 may extend with an inclination in a direction in which the gas diffusion layer 100 and the base plate 200 face each other, and may be repeatedly deployed to cross each other along the length direction.

Particularly, since the plurality of first circulation portions 310 may be repeatedly disposed to cross each other, the distance between the first end portions 3*a* is different from the distance between the second end portions 3*b*, and the second circulation portions 320 may be connected to the portion having a long distance between the end portions. In other words, as shown in FIG. 1, since the first circulation portions 310 extend with the inclination, and they may be repeatedly disposed to cross each other along the length direction, a section T1 having a short distance between the first end portions 3*a* and a section T2 having a relatively long distance are repeatedly deployed, and a section T3 having a short distance between the second end portions 3*b* and a section T4 having a relatively long distance may also be disposed repeatedly. The second circulation portions 320 may be disposed to be connected to the section T2 having the relatively long distance between the first end portions 3*a* and the section T4 having the relatively long distance between the second end portions 3*b* of the first circulation portions 310. Accordingly, the shape of the side surface of the flow field forming member 300 may be in the form in which triangles A1 having apexes E1 directed toward the gas diffusion layer 100 and triangles A2 having apexes E2 directed toward the base plate 200 may be disposed repeatedly.

As described above, the shape of the side surface of the flow field forming member 300 may be in the form of triangles since the plurality of first circulation portions 310 arranged in the length direction extend with the inclination in slanting lines disposed to cross each other, and the second circulation portions 320 may be connected to the first circulation portions 310, that is, to the portion having a long distance between the end portions of the first circulation portions 310. By the flow field forming member 300 in the form of triangles, the fastening load that occurs during assembly of the fuel cell stack may be dispersed more uniformly, and the load may be supported more stably. Further, since the second circulation portions 320 of the flow field forming member 300 are formed to extend along the length direction, flat portions may be secured by the second circulation portions 320, and thus regions that come in contact with the gas diffusion layer 100 or the base plate 200 may be prevented from being deformed and damaged.

As described above, since the shape of the side surface of the flow field forming member 300 is in the form of repeated triangles, the components may be prevented from being deformed and damaged, and the air movement may be performed more smoothly by the first openings 311 formed on the first circulation portions 310 and the second openings 321 formed on the second circulation portions 320.

On the other hand, a plurality of first openings 311 may be disposed apart from each other in the width direction on the first circulation portions 310, and one or more first partition portions 312 may extend to cross a space in each of the first openings 311. As described above, since the plurality of first openings 311 may be disposed apart from each other in the width direction on the first circulation portions 310, the air circulation amount may be secured, and since the first partition portions 312 extend to cross the space in each of the first openings 311, the air movement may be performed more smoothly. In addition, since the spaces of the first openings 311 may be filled by the first partition portions 312, the overall stiffness of the flow field forming member 300 may be increased.

Figure 2:
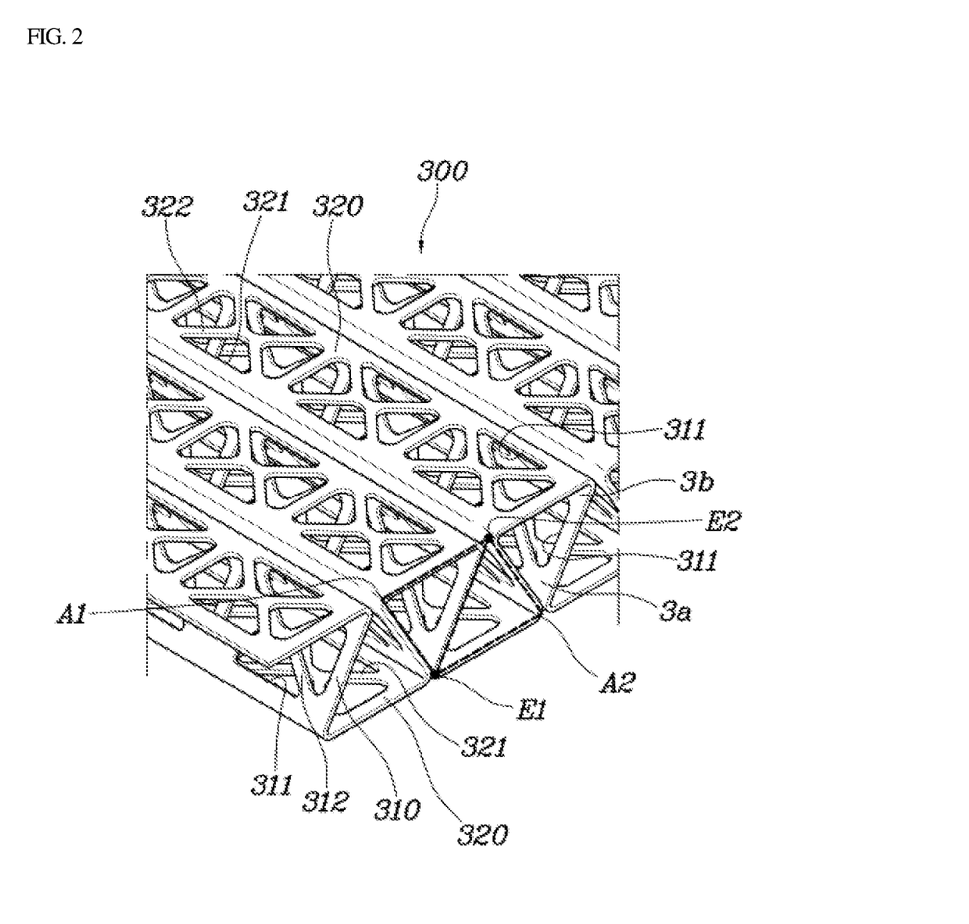
FIG. 2 is a view illustrating a fuel cell apparatus according to a first exemplary embodiment of the present disclosure.
Figure 3:
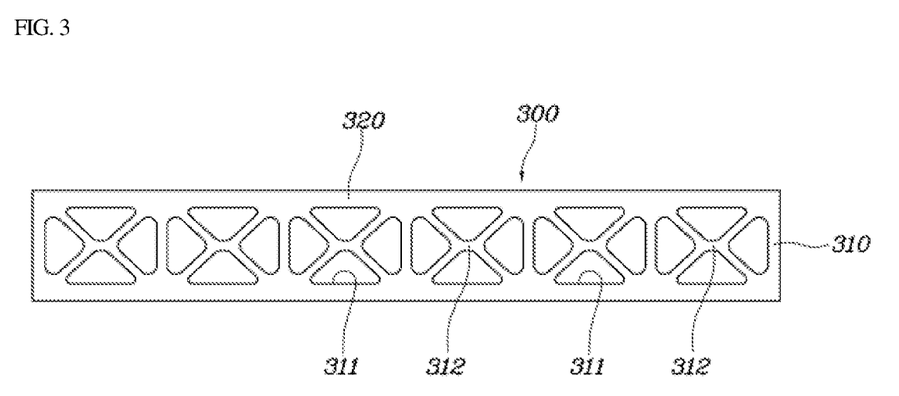
FIG. 3 is a front view explaining a fuel cell apparatus according to the first exemplary embodiment of the present disclosure illustrated in FIG. 2.

In other words, as illustrated in FIGS. 2 and 3, the first partition portion 312 may extend to cross the center of the first opening 311. Since the first partition portion 312 extends to cross the center of the first opening 311, the stiffness of the first circulation portion 310 may be uniformly secured, and thus the load acting thereon may be dispersed more uniformly.

As described above, the first partition portion 312 may extend to cross the center of the first opening 311 in a horizontal or vertical direction, and preferably, the first partition portion 312 may extend in a direction in which the gas diffusion layer 100 and the base plate 200 face each other. Further, a plurality of first partition portions 312 may be provided and formed in the shape of "x" or "+" to cross the centers of the first openings 311.

Further, in the first circulation portion 310 in which the first end portions 3*a* or the second end portions 3*b* are connected to each other by the second circulation portion 320, the first partition portion 312 of the first opening 311 formed in any one of the first circulation portions 310 and the first partition portion 312 of the first opening 311 formed in another of the first circulation portions 310 may extend in different directions. In other words, when the first partition portion 312 of the first opening 311 formed in any one of the first circulation portions 310 (e.g., a first of the first circulation portions) extends in the horizontal direction, the first partition portion 312 of the first opening 311 formed in another of the first circulation portions 310 (e.g., a second of the first circulation portions) may extend in the vertical direction, and thus the diffused air may move more smoothly with the stiffness of the first circulation portions 310 secured.

Particularly, the first opening 311 may be formed in a rectangular shape, and the plurality of the first partition portions 312 may extend to cross the centers of the first openings 311 in different directions. Since the first opening 311 may be formed in a rectangular shape, the air circulation space may be secured, and the plurality of the first partition portions 312 cause the stiffness of the first circulation portions 310 to be increased.

Figure 4:
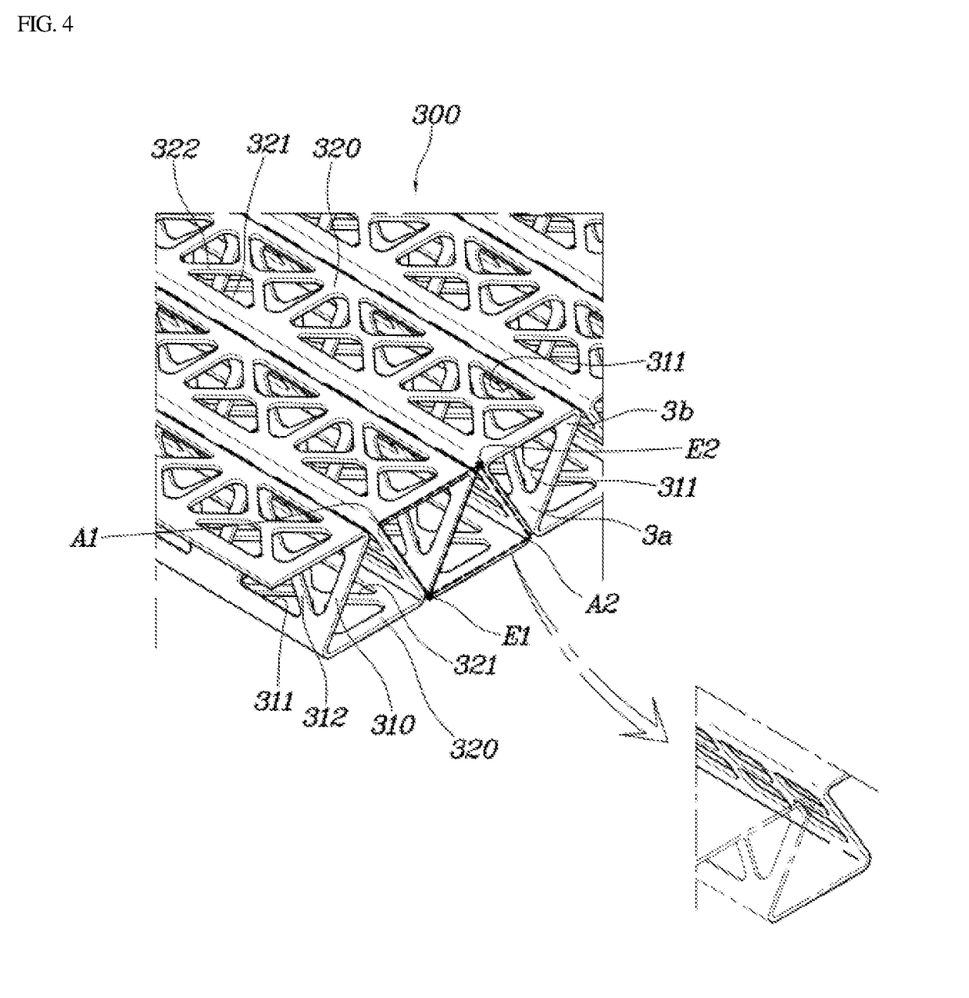
FIG. 4 is a view illustrating a fuel cell apparatus according to a second exemplary embodiment of the present disclosure.
Figure 5:
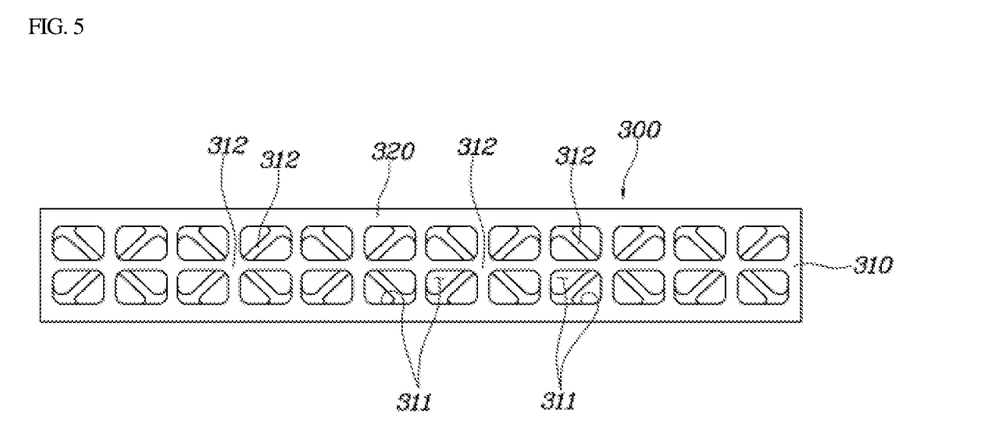
FIG. 5 is a front view explaining a fuel cell apparatus according to the second exemplary embodiment of the present disclosure.

Further, as illustrated in FIGS. 4 and 5, the plurality of the first partition portions 312 may extend to be orthogonal in the center of the first opening 311, and in the first circulation portion 310 in which the first end portions 3*a* or the second end portions 3*b* are connected to each other by the second circulation portion 320, the first partition portion 312 of the first opening 311 formed in any one of the first circulation portions 310 and the first partition portion 312 of the first opening 311 formed in another of the first circulation portions 310 may be inclined to not mutually match each other (e.g., no mutual symmetry).

In other words, as shown in FIGS. 4 and 5, since the plurality of first partition portions 312 may be formed to extend to be orthogonal in the center of the first opening 311, they may be formed in the shape of "x" or "+". Particularly, since the first partition portion 312 of the first opening 311 formed in any one of the first circulation portions 310 and the first partition portion 312 of the first opening 311 formed in another of the first circulation portions 310 may be inclined to not mutually match each other, the first partition portions 312 may be repeated to cross each other in the shape of "x" and "+" in the length direction.

As described above, since the plurality of first partition portions 312 may extend to be orthogonal in the center of the first opening 311, the first partition portions 312 may be spaced apart from each other at about 90 degrees, and since the first partition portions 312 cross each other to be inclined at an interval of about 45 degrees with respect to the first circulation portions 310, the stiffness of the first circulation portions 310 may be secured and the diffused air may move more smoothly. On the other hand, as shown in FIGS. 2 and 4, the plurality of second openings 321 may be disposed apart from each other in the width direction in the second circulation portion 320, and one or more second partition portions 322 may extend to cross spaces in the second openings 321.

As described above, since the plurality of second openings 321 may be disposed apart from each other on the second circulation portions 320, the air circulation amount may be secured, and since the second partition portions 322 may extend to cross the space in each of the second openings 321, the air movement may be performed more smoothly. Further, since the spaces of the second openings 321 may be filled by the second partition portions 322, the overall stiffness of the flow field forming member 300 may be increased.

Additionally, since the second partition portions 322 may extend to cross the center of the second opening 321, the stiffness of the second circulation portions 320 may be uniformly secured. The plurality of second partition portions 322 may be provided and formed in the shape of "x" or "+" to cross the centers of the second openings 321. Accordingly, the diffusion performance of the air that passes through the second circulation portions 320 may be improved, and the space for discharging water may be secured.

According to the fuel cell apparatus having the above-described structure, the air transfer performance may be improved in the fuel cell, and the load acting on the gas diffusion layer 100 may be dispersed. Further, the flat contact portion may be secured with respect to the gas diffusion portion, and thus the gas diffusion layer 100 may be prevented from being damaged and deformed.

Although the specific exemplary embodiments of the present disclosure have been illustrated and described for illustrative purposes, those of ordinary skill in the art will appreciate that various modifications, additions and substitutions are possible, without departing from the scope and spirit of the invention as disclosed in the accompanying claims.

What is claimed is:

1. A fuel cell apparatus, comprising:
a gas diffusion layer of a fuel cell;
a base plate disposed apart from the gas diffusion layer and configured to form an air circulation path; and
a flow field forming member having a plurality of first circulation portions formed to extend in a width direction and having first openings formed to allow air to pass through, each of the plurality of first circulation portions having a first end portion and a second end portion formed to extend toward the gas diffusion layer and the base plate, respectively, the plurality of first circulation portions being arranged apart from each other along a length direction, and a plurality of second circulation portions formed to extend in the width direction and having second openings formed to allow air to pass through, each of the plurality of second circulation portions alternately connecting the first end portion or the second end portion of each of the first circulation portions along the length direction,
wherein a shape of a side surface of the flow field forming member is in the form of repeated polygonal patterns through the first circulation portions and the second circulation portions,
wherein the plurality of first circulation portions extend with an inclination in a direction in which the gas diffusion layer and the base plate face each other, and are repeatedly disposed to each other in a cross direction along the length direction,
wherein the first circulation portions are repeatedly disposed to cross each other with a distance between the first end portions different from a distance between the second end portions, and the second circulation portions are connected to a portion having a longer distance in a distance between the first end portions or the second end portions.

2. The fuel cell apparatus according to claim 1, wherein the shape of the side surface of the flow field forming member is in the form in which triangles having apexes directed toward the gas diffusion layer and triangles having apexes directed toward the base plate are repeated.

3. The fuel cell apparatus according to claim 1, wherein the second circulation portions of the flow field forming member are formed to extend along the length direction, and have flat portions that come in contact with the gas diffusion layer or the base plate.

4. The fuel cell apparatus according to claim 1, wherein a plurality of the first openings are disposed apart from each other in the width direction in the first circulation portion, and one or more first partition portions extend to cross a space in each of the first openings.

5. The fuel cell apparatus according to claim 4, wherein the first partition portions extend to cross a center of the first opening.

6. The fuel cell apparatus according to claim 5, wherein in the first circulation portion in which the first end portions or the second end portions are connected to each other by the second circulation portion, the first partition portions of the first opening formed in any one of the first circulation portions and the first partition portions of the first opening formed in another of the first circulation portions extend in different directions.

7. The fuel cell apparatus according to claim 4, wherein the first opening is formed in a rectangular shape, and a plurality of the first partition portions extend to cross a center of the first opening in different directions.

8. The fuel cell apparatus according to claim 7, wherein the plurality of the first partition portions extend to be orthogonal in the center of the first opening, and in the first circulation portion in which the first end portions or the second end portions are connected to each other by the second circulation portion, the first partition portions of the first opening formed in any one of the first circulation portions and the first partition portions of the first opening formed in another of the first circulation portions are inclined to be asymmetric.

9. The fuel cell apparatus according to claim 1, wherein a plurality of the second openings are disposed apart from each other in the width direction in the second circulation portion, and one or more second partition portions extend to cross a space in the second opening.

10. The fuel cell apparatus according to claim 9, wherein the second partition portions extend to cross a center of the second opening.

* * * * *